Sept. 26, 1939.  C. C. FARMER  2,173,936
TRIPLE VALVE DEVICE
Filed Nov. 24, 1938  3 Sheets-Sheet 1

INVENTOR
CLYDE C. FARMER
BY
ATTORNEY

Patented Sept. 26, 1939

2,173,936

UNITED STATES PATENT OFFICE 2,173,936

TRIPLE VALVE DEVICE

Clyde C. Farmer, Pittsburgh, Pa., assignor to The Westinghouse Air Brake Company, Wilmerding, Pa., a corporation of Pennsylvania Application May 24, 1938, Serial No. 209,647

4 Claims. (Cl. 303—39)

This invention relates to fluid pressure brake equipment for railway vehicles and more particularly to that type of equipment in which the K-triple valve device is employed.

In operating long trains it is desirable to so control the rate of build up in brake cylinder pressure in effecting an emergency application of the brakes as to prevent the development of too high a braking force on the cars at the head end of the train in advance of the development of a braking force on the rear cars of the train of sufficient magnitude to prevent the slack in the train from closing or running in harshly and causing heavy damaging shocks.

This cannot be accomplished with the ordinary K-triple valve device for the reason that, in effecting an emergency application of the brakes, the flow of fluid to each brake cylinder of the train is at a single fast rate which causes such a high braking force to be developed on the head end of the train as compared with that developed on the rear of the train as to cause the slack in the train to close or run in with such force as to produce heavy damaging shocks.

The principal object of the invention is to provide a K-type of triple valve device having means operative automatically in effecting an emergency application of the brakes to so control the flow of fluid under pressure to a brake cylinder and thereby the rate of increase in brake cylinder pressure as to insure a brake application which will result in the gentle closing or run in of the slack in the train.

According to this object the triple valve device includes a control means whereby, in effecting an emergency application of the brakes, the brake cylinder pressure is increased in such a manner as to prevent the development of too high a braking force on the cars at the head end of the train in advance of the development of a material braking force on the cars further back in the train. By thus controlling the rate of increase in the brake cylinder pressure harsh run in or closing of the slack in the train which would otherwise occur is effectively eliminated.

Other objects and advantages will appear in the following more detailed description of the invention.

Figure 1:
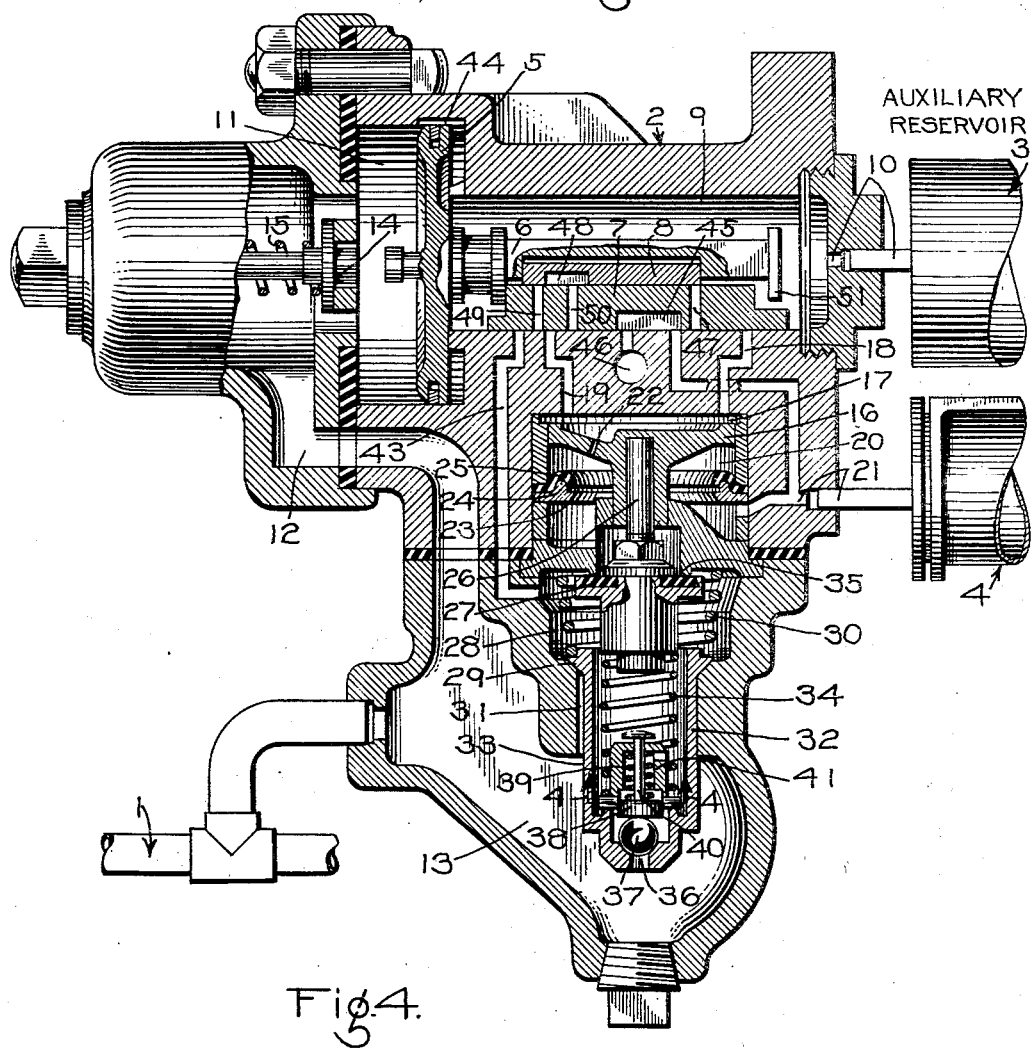
Figure 2:
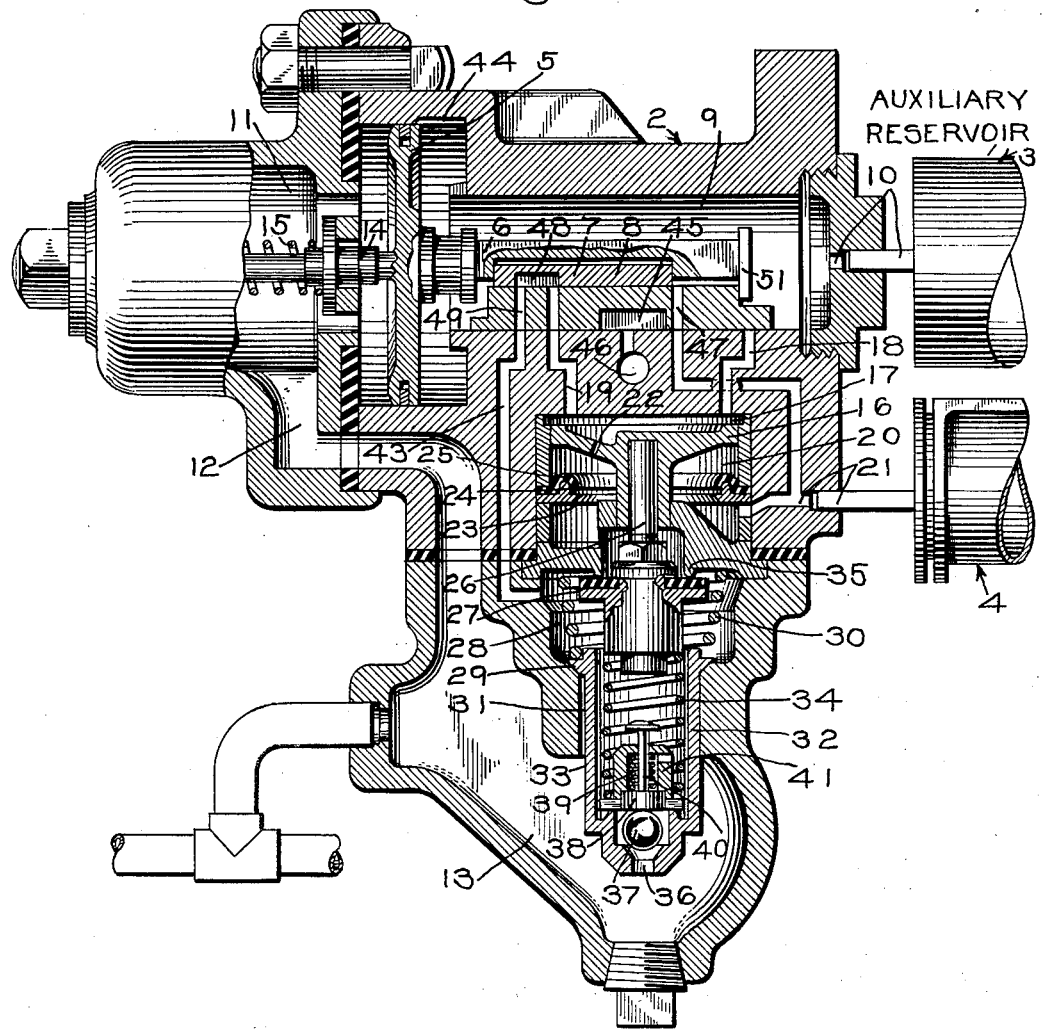
Figure 3:
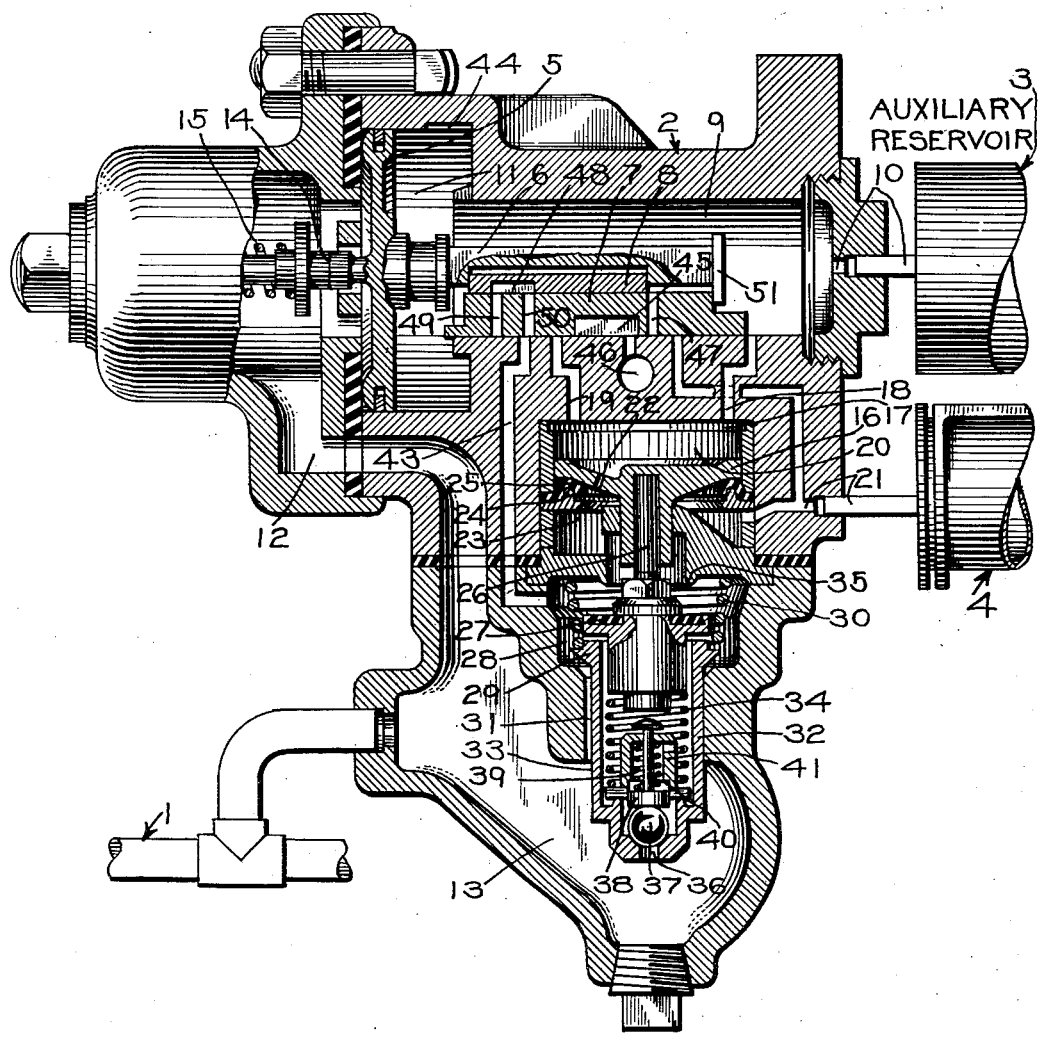

In the accompanying drawings, Figs. 1, 2 and 3 are diagrammatic views, mainly in section, of a fluid pressure brake equipment comprising a K-type of triple valve device embodying the invention, Fig. 1 showing the equipment in release position, Fig. 2 showing the equipment in quick service application position and Fig. 3 showing the equipment in emergency application position; and Fig. 4 is a detailed cross sectional view taken on the line 4—4 of Fig. 1.

The brake equipment shown in the drawings for illustrative purposes comprises a brake pipe 1, a triple valve device 2, an auxiliary reservoir 3 and a brake cylinder 4.

The triple valve device 2 is of the K-type and comprises a casing having operatively mounted therein a piston 5 having a stem 6 adapted to actuate a main slide valve 7 and an auxiliary slide valve 8 contained in the chamber 9 which is connected through a passage and pipe 10 to the auxiliary reservoir 3. At the face side of the piston there is the usual piston chamber 11 which is connected through a passage 12 and a chamber 13 to the brake pipe 1.

Slidably mounted in the casing and arranged to engage with the piston 5 in the usual manner is a graduating stop 14 with which is associated the graduating spring 15.

It should here be mentioned that the triple valve piston 5, piston stem 6, auxiliary slide valve 8, graduating stop 14 and spring 15 may each be identical with the corresponding part of the usual K-triple valve device, and that with the exception of the omission of the usual emergency port the main slide valve 7 may be identical with the corresponding slide valve of the usual K-triple valve device.

Operatively mounted in the casing of the triple valve device is an emergency piston 16 having at one side a chamber 17 which is connected to an emergency port 18 leading to the seat for the main slide valve 8, and which is connected to the quick service port 19 also leading to the seat for the main slide valve. At the other side of the piston 16 there is a chamber 20 which is connected through a passage and pipe 21 to the brake cylinder 4. The chamber 17 is connected to the chamber 20 through a flow restricting or controlling port 22 provided in the emergency piston. Riddidly secured to the casing and projecting into the chamber 20 is an annular stop member 23 having an annular rib 24 on which there is mounted a gasket 25 which may be made of a rubber composition. The underside of the emergency piston is adapted to seal against this gasket when the piston is moved to its emergency position so as to prevent fluid under pressure which may flow from the chamber 17 past the periphery of the piston from flowing to the brake cylinder. This, as will hereinafter more fully appear, will insure the proper control of the rate of increase in brake cylinder pressure by the port 22 in the piston.

The emergency piston 16 is provided with a stem 26 for controlling the operation of a valve 27 contained in the chamber 28, said valve being adapted to control communication between chambers 20 and 28. Also contained in chamber 28 is a check valve 29 which is subject to the pressure of a spring 30 contained in chamber 28, which spring normally maintains the valve seated on an accommodating seat formed on the casing as shown in Fig. 1 so as to cut off communication between the chamber 28 and a passage 31 leading from the brake pipe chamber 13.

The check valve 29 is provided with a downwardly extending hollow portion 32 which is slidably guided in the casing, the lower end of the hollow portion terminating within the chamber 13. This hollow portion is provided with a groove 33 which is adapted to permit the flow of fluid from the chamber 13 as will hereinafter more fully appear. If desired, a plurality of grooves 33 may be provided.

Contained within the hollow portion 32 of the check valve 29 is a spring 34 which acts to normally maintain the valve 27 in sealing engagement with an annular seat rib 35 carried by a bushing which is secured to the casing. The lower end of the hollow portion 32 is provided with a passage 36 which is open at its outer end to the chamber 13 and at its inner end to the interior of the portion. The inner end of the passage 36 is made in the form of a valve seat which is adapted to be engaged by a ball check valve 37 contained in the hollow portion, said valve being normally maintained seated by a plunger 38 subject to the pressure of a spring 39, which plunger has a stem 40 that is slidably guided by a cage member 41 which is held in place in the hollow portion by the lower end of the spring 34. The lower end of the cage member is provided with slots 42 through which fluid may flow to the chamber 28 when the check valve is unseated.

The chamber 28 is connected to a quick service passage 43 leading to the seat for the main slide valve 7.

Initial charging

To charge the equipment fluid under pressure is supplied to the brake pipe 1 in the usual manner and flows therefrom through chamber 13 and passage 12 to the piston chamber 11 and from thence flows through a feed groove 44 to the slide valve chamber 9 and from thence through passage and pipe 10 to the auxiliary reservoir. From the chamber 13 fluid under pressure flows past the ball check valve 37 to the chamber 28.

With the triple valve parts in release position the brake cylinders 4 and chambers 20 are connected to the atmosphere by way of packing 21, a cavity 45 in the main slide valve 7 and passage 46. The chamber 17, since it is connected through passage 22 to the chamber 20, is also connected to atmosphere.

With the equipment fully charged and the triple valve device in release position, the several parts of the equipment will be in the position in which they are shown in Fig. 1.

Service application

When it is desired to effect a service application of the brakes the brake pipe pressure is reduced at a service rate in the usual manner through the medium of the engineer's brake valve device, not shown. The brake pipe reduction causes a corresponding reduction to be effected in the triple valve piston chamber 11.

When the pressure of fluid in chamber 11 is thus reduced below the pressure of fluid in slide valve chamber 9 and auxiliary reservoir 3, the higher pressure in chamber 9 causes the piston 5 and thereby the slide valves 7 and 8 to be moved to their quick service position, in which position they are shown in Fig. 2.

The piston 5 in its initial movement from release position cuts off communication between the piston chamber 11 and valve chamber 9 by way of the feed groove 44 so as to prevent back flow of fluid from the valve chamber 9 and connected auxiliary reservoir 3 to the piston chamber 11 and brake pipe 1.

At the same time as the feed groove is closed the auxiliary slide valve 8 which is being moved by the piston uncovers the service port 47 in the main slide valve 7 to the valve chamber 9. At substantially the same time as the port 47 is uncovered, a quick service cavity 48 in the auxiliary slide valve connects quick service ports 49 and 50 in the main slide valve together.

Following the uncovering of the service port and the connecting of the ports 49 and 50, a lug 51 on the rear end of the piston stem 6 engages the rear end of the main slide valve so that as the piston continues to move, the auxiliary and main slide valves are moved in unison by the piston to their quick service position in which the service port 47 is opened to the passage 21 and the quick service ports 49 and 50 are in registration with the quick service passages 43 and 19, respectively.

With the service port thus in communication with the passage 21, fluid under pressure flows from the slide valve chamber 9 and connected auxiliary reservoir 3 to the brake cylinder and with the connected quick service ports 49 and 50 in registration with the passages 43 and 19, respectively, fluid under pressure flows from the chamber 28 to the brake cylinder by way of passage 43, port 49, cavity 48, port 50, passage 19, emergency piston chamber 17, port 22, chamber 20 and passage and pipe 21. Now when the pressure of fluid in chamber 28 reduces by such flow to a pressure slightly below the reduced brake pipe pressure in chamber 13, fluid in the chamber 13 lifts the check valve 37 from its seat against the opposing pressure of the plunger 38 and flows through the slots 42 in the check valve cage to chamber 28 and from thence to the quick service communication just traced to the brake cylinder. It should here be mentioned that the rate of the quick service flow of fluid from the brake pipe to the emergency piston chamber 17 is so controlled that such flow will not cause the emergency piston 16 to move from its normal position. However, enough fluid is vented from the local reduction in brake pipe pressure which is transmitted to the next car in the train and so on throughout the length of the train, thus propagating quick service action from car to car throughout the length of the train.

When, for any given reduction in brake pipe pressure, the auxiliary reservoir pressure reduces, by flow of fluid to the brake cylinder, to slightly below that of the brake pipe pressure in chamber 11, the piston 5 and thereby the auxiliary slide valve 8 is caused to move inwardly to lap position in which the valve laps the service port 47 to cut off the flow of fluid from the auxiliary reservoir to the brake cylinder, and in which the valve laps the quick service passage 43 to cut off the quick service flow of fluid from the brake pipe. When the service port is thus lapped there can be no further reduction in auxiliary reservoir pressure, and consequently the triple valve piston and auxiliary slide valve come to a stop in lap position.

*Emergency application*

When the brake pipe pressure is reduced at a fast or emergency rate the triple valve piston and thereby the slide valves 7 and 8 are caused to move to emergency position, in which position they are shown in Fig. 3.

The main slide valve in its travel to emergency position uncovers the upper end of the passage 18 to the valve chamber 9, thereby permitting fluid under pressure from this chamber and consequently from the auxiliary reservoir 3 to flow into the emergency piston chambers 17, the flow of fluid to chamber 17 will be at a faster rate than that at which it is permitted to flow therefrom through the port 22 in the emergency piston, and as a consequence, sufficient pressure is quickly built up in the chamber, to cause the piston to move downwardly into sealing engagement with the gasket 25, the piston in its traverse unseating the emergency valve 27 against the opposing action of the spring 34. With the valve thus unseated, fluid under pressure in chamber 28 flows rapidly to the brake cylinder by way of chamber 20 and passage and pipe 21, thereby effecting a reduction in the chamber pressure at a very fast rate, whereupon fluid at brake pipe pressure in chamber 13 lifts the valve 29 against the opposing pressure of spring 30 and flows through chambers 28 and 20 to the brake cylinder. It will here be noted that with the valve 29 unseated and the main slide valve 7 in emergency position the supply of fluid under pressure to the brake cylinder will be from both the auxiliary reservoir and the brake pipe 1, the flow from the brake pipe being at a much faster rate than that from the auxiliary reservoir.

Now when the brake cylinder pressure has been increased to approximately fifteen pounds, the spring 30 acts to move the valve 29 into engagement with its seat, thus preventing further flow of fluid from the brake pipe to the brake cylinder.

It should here be mentioned that if at the time the check valve 29 closes, the brake pipe pressure in chamber 13 has reduced to or below brake cylinder pressure the ball check valve 37 will remain seated. If, however, at this time the brake pipe pressure in chamber 13 is higher than brake cylinder pressure in chamber 28, fluid at brake pipe pressure in chamber 13 and passage 36 will lift the ball check valve from its seat and flow to chamber 38 and past the emergency valve 27 to chamber 20 and consequently to the brake cylinder. Both of these pressure conditions may exist simultaneously in the brake pipe of a long train as will be apparent from the following description.

On the head end of a train, that is to say on the first four or five cars, the reduction in brake pipe pressure, in initiating an emergency application of the brakes is at such a fast rate that by the time the valve 29 closes the brake pipe pressure may be just slightly higher than brake cylinder pressure and in some instances may be as low as or lower than brake cylinder pressure. If the brake pipe pressure should be sufficiently higher than brake cylinder pressure to cause the ball check valve 37 to move away from its seat against the opposing action of the spring 39, fluid under pressure will flow from the brake pipe to the brake cylinder but since the brake pipe pressure will be so close to brake cylinder pressure at this time the increase in brake cylinder pressure due to such flow will be negligible. If the brake pipe pressure should be low enough that it cannot overcome the pressure of the spring 39 the ball check valve 37 will remain seated and as a result there will be no further flow whatever from the brake pipe to the brake cylinder.

Since the triple valve main slide valve is still in emergency position, the flow of fluid from the auxiliary reservoir to the brake cylinder by way of port 22 in the emergency piston 16 continues to increase brake cylinder pressure but at a slower rate than when the valve 29 was open.

It will here be noted that since the emergency piston is in sealing engagement with the gasket 25, fluid under pressure which flows past the periphery of the piston is not permitted to flow to the brake cylinder, thus the control of the rate of increase in brake cylinder pressure by the port 22 is insured.

When, following the seating of the valve 29, the reducing auxiliary reservoir pressure in the emergency piston chamber 17 and acting on one side of the emergency piston becomes slightly less than the combined pressures of fluid in chamber 20, spring 30 and spring 34 acting on the piston in opposition to the reduced auxiliary reservoir pressure, the emergency piston and emergency valve 27 move upwardly under the influence of this higher pressure to their normal position in which the valve engages the seat rib 35 and thereby closes communication between the chambers 20 and 28.

The emergency piston 16 has a loose fit in its associated guide bushing so that when the piston moves out of sealing engagement with the gasket 25, as above mentioned, fluid under pressure from the auxiliary reservoir besides flowing to the brake cylinder by way of port 22 also flows past the periphery of the piston, thus providing a final inshot of fluid under pressure to the brake cylinder.

From the foregoing description it will be seen that on the first four or five cars of the train, the brake cylinder pressure will be increased at three different rates, first at a fast rate to take up slack in the brake rigging and to effect an application of the brakes with sufficient force to start the slack in the train to gather or run in, then at a slower rate while the slack is gathering and finally at a fast rate.

On the remaining portion of the train the rate of reduction in brake pipe pressure will be progressively slower from car to car toward the rear of the train, so that when the valve 29 seats upon the attainment of the brake cylinder pressure of approximately fifteen pounds the brake pipe pressure will be higher than on the first four or five cars. In practice it has been found that on a long train of cars the brake pipe pressure on the first four or five cars reduces from the normal pressure of seventy pounds to around twenty pounds or lower by the time the brake cylinder pressure has been increased to fifteen pounds, and that further back in the train, say on the fiftieth car, the pressure reduces to around forty-two pounds and on the ninety-fifth or last car to forty-five pounds. From this it will be apparent that since the brake pipe pressure on the cars to the rear of the fourth or fifth car will be well above brake cylinder pressure when the valve 29 seats, fluid at brake pipe pressure will flow past the ball check valve 37 to the brake cylinder until such time as the brake pipe pressure is reduced to substantially brake cylinder pressure, at which time the spring 39, acting through the medium of the plunger 40, causes the ball check valve to seat. From the time the emergency application of the brakes is initiated until the auxiliary reservoir pressure and brake cylinder pressure equalize, fluid under pressure flows uninterruptedly from the auxiliary reservoir through port 22 to the brake cylinder so that at the time the valve 29 closes until the ball check valve 37 seats, the combined flow of fluid from the auxiliary reservoir and brake pipe by way of the port 22 and ball check valve 37, respectively, increase brake cylinder pressure.

With the ball check valve 37 seated, the increase in brake cylinder pressure is continued at a slower rate by the flow of fluid from the auxiliary reservoir through the port 22 alone.

Now when the reducing auxiliary reservoir pressure in the emergency piston chamber 17 becomes slightly less than the combined pressures of fluid in chamber 20, spring 30 and spring 34, the emergency piston and emergency valve 27 are caused to move upwardly to their normal position, as hereinbefore described in connection with the cars at the head end of the train. In this position the valve engages the seat rib 35 and closes communication between the chambers 20 and 28, and the piston, since it has been moved out of sealing engagement with the gasket 25, permits fluid under pressure to flow past the periphery thereof, thus providing a final inshot of fluid under pressure to the brake cylinder.

It will be seen from the foregoing description that, on the cars where the emergency reduction in brake pipe pressure is slower than on the first few cars at the head end of the train, the brake cylinder pressure, instead of being increased at three different rates as is the case at the head of the train, is increased at four different rates, first at a fast rate, second at a somewhat reduced rate, third at a further reduced rate, and finally at a fast rate.

It should here be mentioned that since the brake pipe pressure is progressively higher from car to car toward the rear end of the train, the amount of fluid under pressure which will flow from the brake pipe to the brake cylinder past the check valve 37 correspondingly increases towards the rear end of the train. This results in a progressively faster development of brake cylinder pressure towards a rear end of the train and therefore insures the attainment of maximum brake cylinder pressure in less time than is required to attain the same brake cylinder pressure at the head end of the train. From this it will be apparent that the brake cylinder build-up characteristic compensastes materially for the time required to transmit the serial action throughout the length of the train and therefore provides a more uniform or synchronous development of braking power throughout the length of the train, which obviously insures gentle closing or run in of the slack in the train.

While one illustrative embodiment of the invention has been described in detail, it is not my intention to limit the scope to this embodiment or otherwise than by the terms of the appended claims.

Having now described my invention, what I claim as new and desire to secure by Letters Patent, is:

1. In a fluid pressure brake equipment, in combination, a brake pipe, a brake cylinder, a reservoir normally charged with fluid under pressure, a brake controlling valve device operative upon a reduction in brake pipe pressure at an emergency rate for supplying fluid under pressure to the brake cylinder to effect an emergency application of the brakes, said brake controlling valve device including a valve for admitting fluid under pressure from said reservoir to the brake cylinder uninterruptedly during the emergency application, an emergency valve mechanism having means for retarding the rate of flow of fluid from said reservoir to the brake cylinder, said emergency valve mechanism being responsive to the pressure of fluid flowing from the auxiliary reservoir to establish a communication through which fluid under pressure may flow from the brake pipe to the brake cylinder, and valve means operative upon the establishing of said communication for admitting fluid under pressure from the brake pipe to said communication and thereby to the brake cylinder first at a fast rate until the predetermined brake cylinder pressure is attained and then at a slow rate until the brake pipe pressure becomes equal to brake cylinder pressure.

2. In a fluid pressure brake equipment, in combination, a brake pipe, a brake cylinder, a reservoir normally charged with fluid under pressure, a triple valve device having valve means operative upon a reduction in brake pipe pressure at an emergency rate to supply fluid under pressure from said reservoir to the brake cylinder uninterruptedly during an emergency application of the brakes and also having an emergency valve mechanism for controlling the rate of flow of fluid from the reservoir to the brake cylinder, said emergency valve mechanism being operative by fluid under pressure being supplied by said valve means to admit fluid under pressure from the brake pipe to the brake cylinder first at a fast rate until a predetermined brake cylinder pressure is attained and then at a slower rate provided the brake pipe pressure exceeds brake cylinder pressure.

3. In a fluid pressure brake equipment, in combination, a brake pipe, a brake cylinder, a reservoir normally charged with fluid under pressure, a triple valve device having valve means operative upon a reduction in brake pipe pressure at an emergency rate for supplying fluid under pressure from said reservoir to the brake cylinder, an emergency valve mechanism having means for controlling the rate of flow of fluid from the reservoir to the brake cylinder, said emergency valve mechanism being operative by fluid under pressure being supplied from the reservoir for establishing a communication through which fluid may flow from the brake pipe to the brake cylinder, a valve operative upon the establishment of said communication for admitting fluid under pressure from the brake pipe to the communication and thereby to the brake cylinder at a fast rate, means operative upon a predetermined increase in brake cylinder pressure for actuating said valve to cut off the fast flow of fluid under pressure from the brake pipe to the brake cylinder, and means operative to continue the flow of fluid under pressure from the brake pipe through to the brake cylinder at a slower rate provided brake pipe pressure is higher than brake cylinder pressure.

4. In a fluid pressure brake equipment, in combination, a brake pipe, a brake cylinder, a reservoir normally charged with fluid under pressure, a triple valve device having valve means operative upon a reduction in brake pipe pressure at an emergency rate for supplying fluid under pressure from said reservoir to the brake cylinder, an emergency valve mechanism having means for controlling the rate of flow of fluid from the reservoir to the brake cylinder, said emergency valve mechanism being operative by fluid under pressure being supplied from the reservoir for establishing a communication through which fluid may flow from the brake pipe to the brake cylinder, a valve operative upon the establishing of said communication for admitting fluid under pressure from the brake pipe to said communication and thereby to the brake cylinder at a fast rate, means operative upon a predetermined increase in brake cylinder pressure for actuating said valve to cut off the fast flow of fluid under pressure from the brake pipe to the brake cylinder, a restricted communication in said valve through which the flow of fluid from the brake pipe to the brake cylinder continues at a slower rate when brake pipe pressure is higher than brake cylinder pressure, and a valve adapted to prevent back flow of fluid from the brake cylinder to the brake pipe when brake pipe pressure becomes lower than brake cylinder pressure.

CLYDE C. FARMER.

CERTIFICATE OF CORRECTION.

Patent No. 2,173,936. September 26, 1939.

CLYDE C. FARMER.

It is hereby certified that error appears in the printed specification of the above numbered patent requiring correction as follows: Page 4, second column, line 65, claim 3, strike out the word "through"; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.